United States Patent Office 3,362,936
Patented Jan. 9, 1968

3,362,936
SULPHURIZED POLYESTERS
Denise Girard, Paris, France, assignor to Societe
Nationale des Petroles d'Aquitaine, Paris, France
No Drawing. Filed Feb. 9, 1965, Ser. No. 431,466
Claims priority, application France, Feb. 18, 1964,
964,190
9 Claims. (Cl. 260—79)

ABSTRACT OF THE DISCLOSURE

Process for preparing polyesters incorporating sulphurized bridges by reacting polythioformaldehydes with alkylene oxides to form hydroxylalkylene end-blocked polysulfide intermediates, and subsequently reacting such intermediates with dialkyl esters of dicarboxylic acids to form first the monoester and then, by progressive heating, the desired polyester product. The polyesters may be drawn into highly flexible filamentary products.

---

The present invention relates to new sulphurized polyesters and the process for the preparation thereof. It also has for its object the new polythiomethylene diols and the sulphurized monomeric esters obtained as intermediates in the preparation of these polyesters and, in particular, the sulphurized terephthalates.

The new products according to the invention have one important common characteristic, which is that they all have at least one chain with sulphurized bridges of the type:

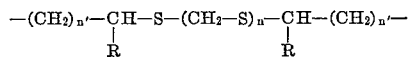

in which: R represents a hydrogen atom or an optionally substituted alkyl, cycloalkyl, aryl or aralkyl radical; $n$ is an integer, usually between 2 and 8; $n'$ is an integer which may assume the value zero. They can thus be represented by the following general formulae:

I. Polythiomethylene diol HO—A—OH (A— the chain indicated above)

II. Monoester of this diol
    R'—OOC—R"—COO—A—OH

III. Diester
    R'—OOC—R"—COO—A—OOC—R"—COO—R'

IV. Polyester
    R'—OOC—[R"—COO—A—OOC]$_x$—R"—COO—R' where R' is an alkyl radical, R" is an organic acid radical, particularly of phthalic acid —C$_6$H$_4$—, and $x$ is an integer greater than 1.

The diols of Formula I, in which $n'=1$, can be obtained by a process which also forms the subject of the invention and which consists in causing dithiols of the type HS(CH$_2$S)$_n$—H to react with carbonates of lower olefins of the formula R—HC=CH$_2$, where R has the meaning indicated above, or even with a glycol monoester or diester corresponding to the oxide of this olefin.

In these dithiols, the number $n$ of groups —CH$_2$S— is usually of the order of 2 to 8; highly interesting polyesters are obtained from dithiols of which $n$ has a mean value between 3 and 4, particularly in the region of 3.5.

The olefin oxide derivatives which are used are selected from the compounds capable of reacting on the two thiol functions in order to cause an addition of the olefin oxide to the —SH groups. For example, it is possible to use glycol monochlorhydrin. The carbonates are particularly suitable, particularly those of ethylene, propylene, butene, etc.

It is obvious that the invention also covers the polyoxyalkylated diols which are obtained by condensation of several molecules of olefin oxide on a dithiol.

The reaction is carried out under atmospheric pressure and in the presence of an alkaline catalyst, as for example a sodium or potassium alcoholate. 2 mols of olefin carbonate are used per mole of dithiol. A temperature higher than the melting point of the salt is used, desirably between 50° and 115° C., until liberation of CO$_2$ gas has ended. The yield of primary dialcohol of the type HO—A—OH is practically quantitative. For example, when ethylene carbonate and an oligomeric dithiol, in which $n$ is on average equal to 3.5, are present under the conditions indicated above, the reaction can be written:

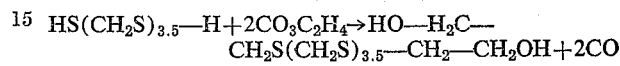
    CH$_2$S(CH$_2$S)$_{3.5}$—CH$_2$—CH$_2$OH+2CO

The preparation in accordance with the invention of terephthalic polyesters (IV) which are of particular interest can be carried out, in accordance with conventional processes, by polycondensation of diols HO—A—OH with terephthalic acid.

In accordance with the present invention it is, however, preferred to react the diol HO—A—OH with a dialkyl terephthalate or with a dialkyl ester of another di-acid to effect trans-esterification and, subsequently, poly-esterification of the acid salt. Such reactions are carried out by heating the specified materials at temperatures between 100° and 300° C. In the initial reaction a compound of Formula II, i.e., a sulfurized monoester having an alcoholic function, is prepared by trans-esterification of the dialkyl terephthalate or other dialkyl ester, e.g., the dimethyl, diethyl, dipropyl, di-isopropyl, dibutyl or di-isobutyl ester of terephthalic, phthalic, maleic, fumaric, adipic, azelaic, or sebacic acid, with the diol. The corresponding diester of Formula III and polyester of Formula IV are obtained by progressive heating of such monoester, in accordance with the known technique employed in the preparation of ethylene glycol polyterephthalate.

The trans-esterification of the dialkyl terephthalate by the diol or mixture of diols of Formula I in accordance with the invention is effected by the reagents being heated in vacuo at temperatures between about 100° and 150° C. and in the presence of catalysts. The methyl alcohol which is formed and the dialkyl terephthalate which has not reacted are removed from the reaction mass, it being possible for the terephthalate to be recycled in a continuous process. As catalysts, there are employed known products, such as for example an alkali metal in divided state, to which magnesium is possibly added. The trans-esterification reaction is terminated in practice after heating to 160° C. under a pressure of 0.5 mm. Hg. Under these conditions, there are obtained terephthalates of the type (II) indicated above, having a terminal primary alcohol function and generally existing in the form of hard products of not well-defined melting points, usually lower than 130° C.

In order to effect the poly-esterification, the heating of the reaction mass previously obtained is continued progressively up to temperatures which may reach 200–300° C. under a vacuum lower than 0.5 mm. Hg. By proceeding in stages in this way, it is possible to isolate fairly low molecular weight polyesters as intermediates, corresponding to the above Formula III, as well as polymers with a longer macromolecular chain and of the aforementioned type (IV). Generally speaking, the solid products obtained after prolonged heating have a mean molecular weight which varies between wide limits and may reach several thousands. While the products of low molecular weight are hard and brittle solids, the terephthalic polyesters of Formula IV and of high molecular weight generally have a waxy consistency and have interesting properties, particularly that of being capable of being drawn into highly flexible filaments.

The following examples, described in non-limiting manner, show how the invention may be carried into practice. Example 1 illustrates the preparation of sulphurized diols; Example 2 illustrates the preparation of monomeric terephthalates with a terminal alcohol function; Example 3 shows how poly-terephthalates of varying degree of polycondensation are obtained. The invention is of course not limited to these particular polyesters, but is equally applicable to those of which the acid may be different, such as particularly: fumaric, adipic, azelaic or sebacic acids, or even phthalic and maleic anhydrides, etc.

*Example 1*

Into a 500 ml. spherical flask having three necks and equipped with a stirrer device, a thermometer and a condenser connected to a gas meter, there are introduced:

88 g. (1 mol) of ethylene carbonate,
1.5 g. of sodium ethylate,
110 g. (0.58 mol) of an oligomeric dithiol of the formula: $HS-(CH_2S)_{3.5}-H$ The contents of the flask are heated progressively by means of a thermostatic bath, maintaining a good stirring action as soon as the temperature reaches 40° C., i.e. the melting temperature of the ethylene carbonate.

The release of carbon dioxide gas is found to start from 50° C. The temperature is then raised progressively to 115° C. until the termination of the release of gas, namely, 18.8 liters of $CO_2$, for a theoretical 22.4 liters.

The crude product obtained is a white solid melting in the region of 110° C. It is insoluble in water and in the majority of conventional organic solvents. However, it is dissolved by dimethyl formamide and pyridine.

After purification of the crude product by extraction with water and then with benzene, a diol is obtained which, from elementary analysis, the measurement of the hydroxyl index and the infra-red spectrum, corresponds to the summary formula:

$HOH_2C-CH_2S-(CH_2S)_{3.5}-CH_2-CH_2OH$

By subjecting the crude product, obtained as set out above, to a series of extractions with selective solvents or to a fractionated precipitation, it is possible to isolate various fractions of diols of the general formula:

$HOH_2C-CH_2S-(CH_2S)_n-CH_2-CH_2OH$  (V)

in which $n$ may assume integral or fractional values from 3 to 6.

*Example 2*

Into a 1-liter spherical flask equipped with a thermocouple, a tube for introduction of inert gas and a Vigreux column connected to a condenser and a vacuum pump, there are introduced:

60 g. (0.21 mol) of polythiomethylene diol with $C_9$ ($n=5$ in the above Formula V),
60 g. (0.31 mol) of dimethyl terephthalate,
3 g. of magnesium turnings,
0.05 g. finely divided sodium.

The reaction takes place under a stream of argon, the evolution thereof being followed by analysis of samples taken after different heating periods.

The reaction mass is brought in 1 hour from 108° to 146° C., under a pressure of 15 mm. Hg. A part of the methyl terephthalate sublimes and is deposited on the less hot walls of the spherical flask.

The methanol which has formed and which distills is collected in cooled pans.

The reaction product obtained is a hard and brittle solid which is light gray in color.

It melts at a temperature below 105° C., its melting being incomplete. Its hydroxyl index is of the order of 2.7 to 3.4.

The heating is then continued under 0.7 mm. Hg for 2 hours from 96° to 100° C., and then for 1¾ hours from 100° to 160° C. After this time, there is obtained a hard solid which is gray in color and having the characteristics:

Incomplete melting: 95° to 115° C.,
Hydroxyl index: 2.65

The analyses carried out on the product permit this latter to have attributed thereto the formula:

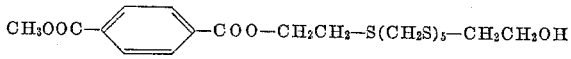

*Example 3*

As starting material for the preparation of a polycondensation product, there is used the reaction mass obtained in Example 2.

This mass is heated at 0.4 mm. Hg from 122° to 140° C. for 30 minutes, and then from 140° to 200° C. for 5 hours. As well as residual methyl terephthalate and a decomposition product, which distills and is condensed in the pans, there is obtained a hard and brittle solid which is brownish in color and which has a melting temperature from 105° to 106° C. (with decomposition).

By again continuing the heating at 0.5 mm. Hg for 4½ hours from 160° to 200° C. and then for 2 hours from 200° to 300° C., there are obtained polycondensates of the structure (IV) as indicated above, among which can be shown a polyterephthalate of the type:

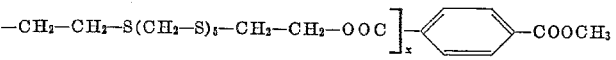

The product has a waxy consistency, it melts from 60° C. and its hydroxyl index is 0.4.

The polycondensates, including the above product, may be drawn into fibers and filaments which have a high flexibility.

I claim:

1. Polythiomethylene diol of the formula:

$HO-CH_2-CH_2S(CH_2S)_nCH_2-CH_2-OH$ melting above 100° C., in which $n$ has on average a value from 3 to 4.

2. A process for the preparation of a hydroxyalkylene end-blocked polysulfide, which comprises reacting a liquid polythioformaldehyde of the formula $HS(CH_2S)_n-H$, wherein $n$ is a number from 2 to 8, with an alkylene oxide derive selected from the group consisting of ethylene carbonate, propylene carbonate and butylene carbonate in the proportion of about two moles of alkylene oxide derivative per mole of the polythioformaldehyde, and in the presence of an alkali metal alcoholate.

3. The process defined in claim 2, wherein the liquid polythioformaldehyde and the alkylene oxide derivative are reacted at atmospheric pressure and at temperatures between 50° and 115° C.

4. The process as defined in claim 2, wherein the liquid polythioformaldehyde has a chain length such that $n$ is about 3.5, and wherein said alkylene oxide derivative is ethylene carbonate.

5. A process for the preparation of a sulphurized ester, which comprises reacting the hydroxyalkylene end-blocked polysulfide prepared in accordance with claim 2, with a dialkyl ester of a di-acid selected from the group consisting of the dimethyl, diethyl, dipropyl, di-isopropyl, dibutyl and di-isobutyl esters of phthalic, terephthalic, maleic, fumaric, adipic, azelaic and sebacic acids, in the presence of an alkali metal catalyst.

6. The process defined in claim 5, wherein the hydroxyalkylene end-blocked polysulfide and said dialkyl ester are reacted at sub-atmospheric pressures and temperatures between 100° and 300° C.

7. The process defined in claim 5, in which the hydroxyalkylene end-blocked polysulfide and said dialkyl ester are heated at temperatures of up to 160° C. to effect trans-esterification of said dialkyl ester to thereby produce the corresponding sulphurized monoester having an alcoholic function, and wherein said monoester is thereafter heated at temperatures of up to 300° C. to produce the corresponding polyesters.

8. The process defined in claim X, wherein said dialkyl ester is dimethyl terephthalate, and in which the hydroxyalkylene end-blocked polysulfide is prepared by the reaction of said liquid polythioformaldehyde with ethylene carbonate.

9. A process for the preparation of a polyester having the formula:

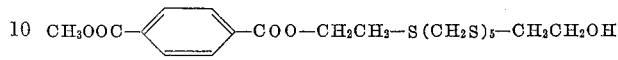

which comprises:
(a) admixing a liquid polythioformaldehyde of the formula HS(CH₂S)₃.₅H with ethylene carbonate, in the proportion of about two moles of ethylene carbonate per mole of the polythioformaldehyde reactant, and in the presence of a sodium ethylate catalyst;
(b) heating the mixture at atmospheric pressures and at temperatures of up to 115° C. to form a hydroxyalkylene end-blocked polysulfide of the formula

HOH₂C—CH₂S—(CH₂S)₃.₅—CH₂—CH₂OH (c) admixing said polysulfide with dimethyl terephthalate and an alkali metal catalyst;
(d) heating the resulting mixture at sub-atmospheric pressures and temperatures of up to 160° C. to effect transesterification of the dimethyl terephthalate and thereby produce a sulphurized monester of the formula

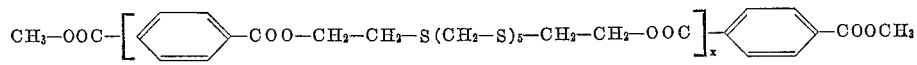

(e) heating the sulphurized monoester thus produced at sub-atmospheric pressures and at temperatures of up to 300° C. to effect polycondensation thereof and thereby produce said polyester.

References Cited
UNITED STATES PATENTS

| | | | |
|---|---|---|---|
| 2,527,374 | 10/1950 | Patrick et al. | 260—78.4 |
| 2,989,512 | 6/1961 | Nishk et al. | 260—79 |
| 3,056,841 | 10/1961 | Saegebarth | 260—609 |
| 3,254,061 | 5/1966 | Martin et al. | 260—79 |

DONALD E. CZAJA, *Primary Examiner.*

L. J. BERCOVITZ, *Examiner.*

M. I. MARQUIS, *Assistant Examiner.*